United States Patent
Suzuki

(10) Patent No.: US 10,489,895 B2
(45) Date of Patent: Nov. 26, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroshi Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 15/844,355

(22) Filed: Dec. 15, 2017

(65) Prior Publication Data

US 2018/0182079 A1 Jun. 28, 2018

(30) Foreign Application Priority Data

Dec. 28, 2016 (JP) ................. 2016-254826

(51) Int. Cl.
| | |
|---|---|
| G06K 9/40 | (2006.01) |
| G06K 9/00 | (2006.01) |
| G06T 5/00 | (2006.01) |
| G06T 7/00 | (2017.01) |

(52) U.S. Cl.
CPC .............. *G06T 5/008* (2013.01); *G06T 7/97* (2017.01); *G06T 2207/10016* (2013.01); *G06T 2207/10152* (2013.01); *G06T 2207/20012* (2013.01); *G06T 2207/20192* (2013.01); *G06T 2207/30201* (2013.01)

(58) Field of Classification Search
CPC ........... A61B 5/0059; A61B 3/10; A61B 3/14; A61B 2562/0204; A61B 2562/0219
USPC .............. 382/274, 167, 162, 312, 118, 169; 348/207.1, 222.1, 229.1, 254; 358/479, 358/1.9, 518
See application file for complete search history.

(56) References Cited

U.S. PATENT DOCUMENTS 7,602,969 B2 * 10/2009 Yamada ............... H04N 5/2354
 348/207.1
2008/0310753 A1 * 12/2008 Edgar ..................... G06T 5/002
 382/274

FOREIGN PATENT DOCUMENTS

JP 2010-200312 A 9/2010

* cited by examiner

*Primary Examiner* — Charlotte M Baker
(74) *Attorney, Agent, or Firm* — Canon USA, Inc., IP Division

(57) ABSTRACT

An image processing apparatus includes a detection unit configured to detect a first area from a first image including an area of a face of an object, the first image being an image captured in a state where light is emitted by a flash, and the first area being an area with luminance higher than a first threshold, within the area of the face, and a correction unit configured to determine a second area that is an area different from the first area in the first image, and correct a color of the first area in the first image, by using information about a color of the second area in the first image, wherein the correction unit determines the second area, based on a second image including an area of the face of the object and captured in a state where light is not emitted by the flash.

10 Claims, 6 Drawing Sheets

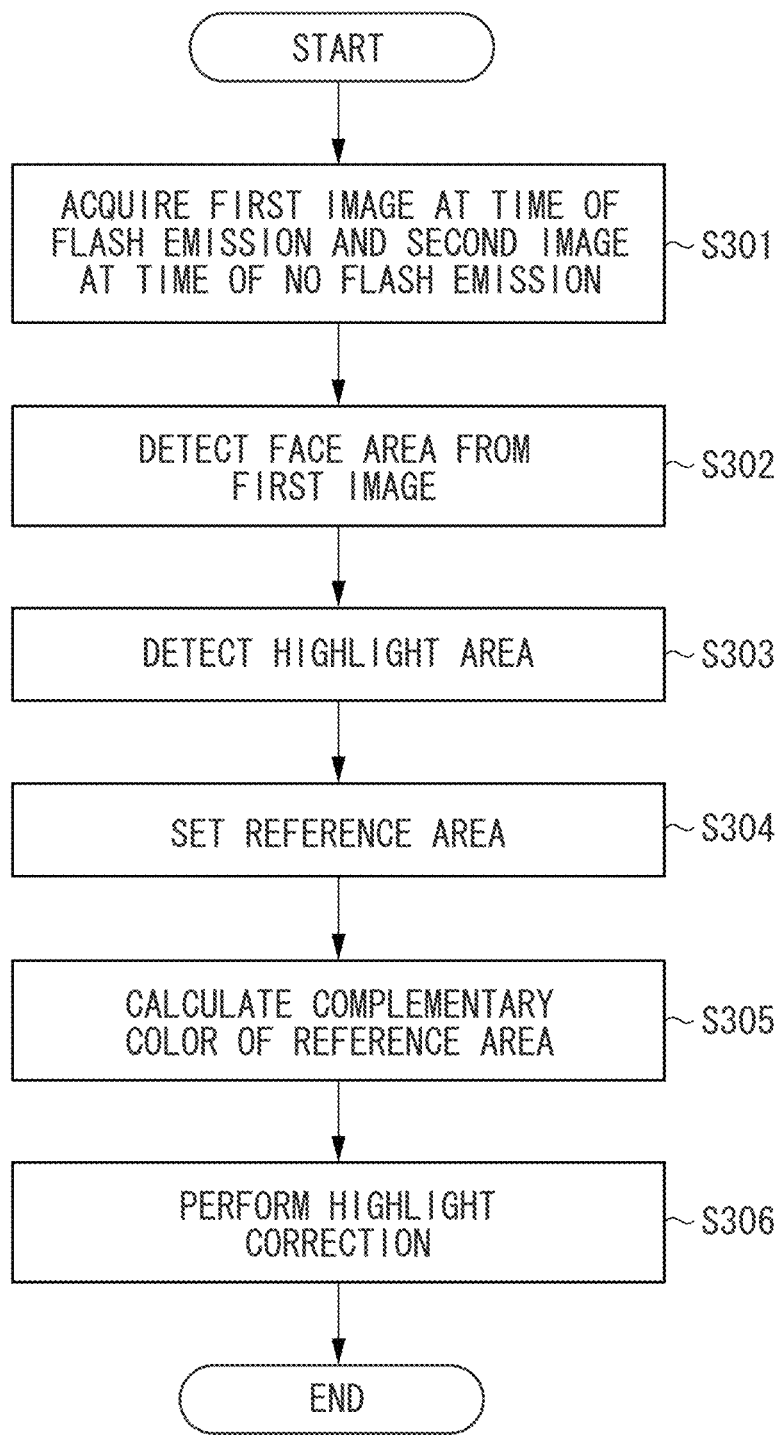

401 HIGHLIGHT AREA

404 REFERENCE AREA (AREA CORRESPONDING TO S2)

402 CORRESPONDING AREA (S1)

403 SIMILAR AREA (S2)

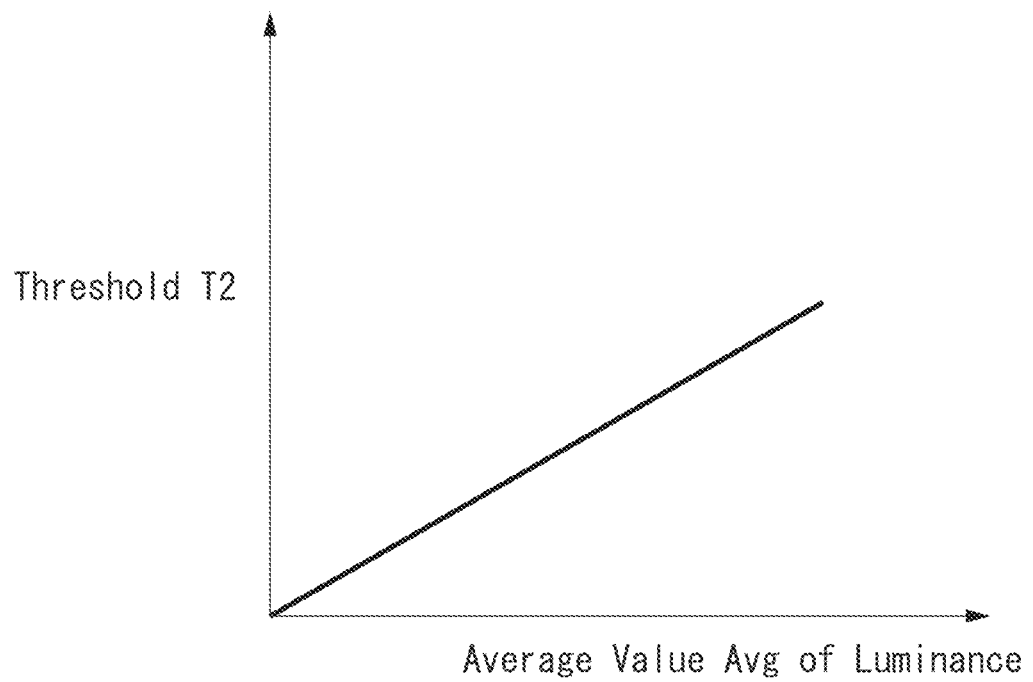

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, and a storage medium, and is, in particular, suitable for use for correction of an image obtained by an imaging unit.

Description of the Related Art

Conventionally, when an image of a person is captured, a highlight area (a so-called shining area) may appear in a part of the skin of the person in the captured image. This occurs depending on a positional relationship of a light source, the person, and an imaging apparatus. In particular, if a highlight area appears in the face of a person in an image captured using a flash, such an area is not desirable in terms of the appearance of the captured image. For this reason, processing for correcting the highlight area included in the captured image is performed in an image processing apparatus. Japanese Patent Application Laid-Open No. 2010-200312 discusses a technique for correcting, in a case where an image is captured using a flash, a highlight area appearing in the captured image with reference to a skin-colored area of a face peripheral portion (e.g., neck) in the captured image.

However, in the technique discussed in Japanese Patent Application Laid-Open No. 2010-200312, the color of the highlight area is brought close to the skin color of the face peripheral portion such as the neck. The skin color around the highlight area and the skin color of the face peripheral portion such as the neck may differ depending on shading or makeup. In this case, the skin color of the highlight area after the correction and the skin color of the face peripheral portion are likely to differ, leading to a possibility that the color after the correction may become unnatural.

SUMMARY

Accordingly, the present disclosure generally relates to an image processing apparatus and an image processing method capable of reducing the difference between the color of a highlight area after highlight correction and the color around the highlight area.

According to one or more aspects of the present disclosure, an image processing apparatus includes a detection unit configured to detect a first area from a first image including an area of a face of an object, the first image being an image captured by an imaging unit in a state where light is emitted by a flash, and the first area being an area with luminance higher than a first threshold, within the area of the face, and a correction unit configured to determine a second area that is an area different from the first area in the first image, and correct a color of the first area in the first image, by using information about a color of the second area in the first image, wherein the correction unit determines the second area, based on a second image including an area of the face of the object and captured by the imaging unit in a state where light is not emitted by the flash.

Further features of the present disclosure will become apparent from the following description of exemplary embodiments with reference to the attached drawings.

BRIEF DESCRIPTION OF THE DRAWINGS

FIG. 3 is a flowchart illustrating processing of the image processing unit according to one or more aspects of the present disclosure.

FIG. 5 is a graph illustrating a relationship between an average value of luminance in a corresponding area, and a threshold according to one or more aspects of the present disclosure.

DESCRIPTION OF THE EMBODIMENTS

Various exemplary embodiments, features, and aspects of the present disclosure are described below with reference to the drawings.

In the present exemplary embodiment, a case where a digital camera is equipped with an image processing apparatus will be described as an example. Examples of the digital camera may include a digital still camera, a digital movie camera, an industrial camera, a vehicle-mounted camera, a medical camera, or the like. However, an apparatus equipped with the image processing apparatus to be described in the following exemplary embodiments is not limited to the digital camera, if the apparatus has a function of performing image processing on an image obtained by an imaging unit. For example, information processing apparatuses such as personal computers and mobile terminals (including mobile phones and tablet terminals) may be equipped with an image processing apparatus to be described in the following exemplary embodiments.

Figure 1:
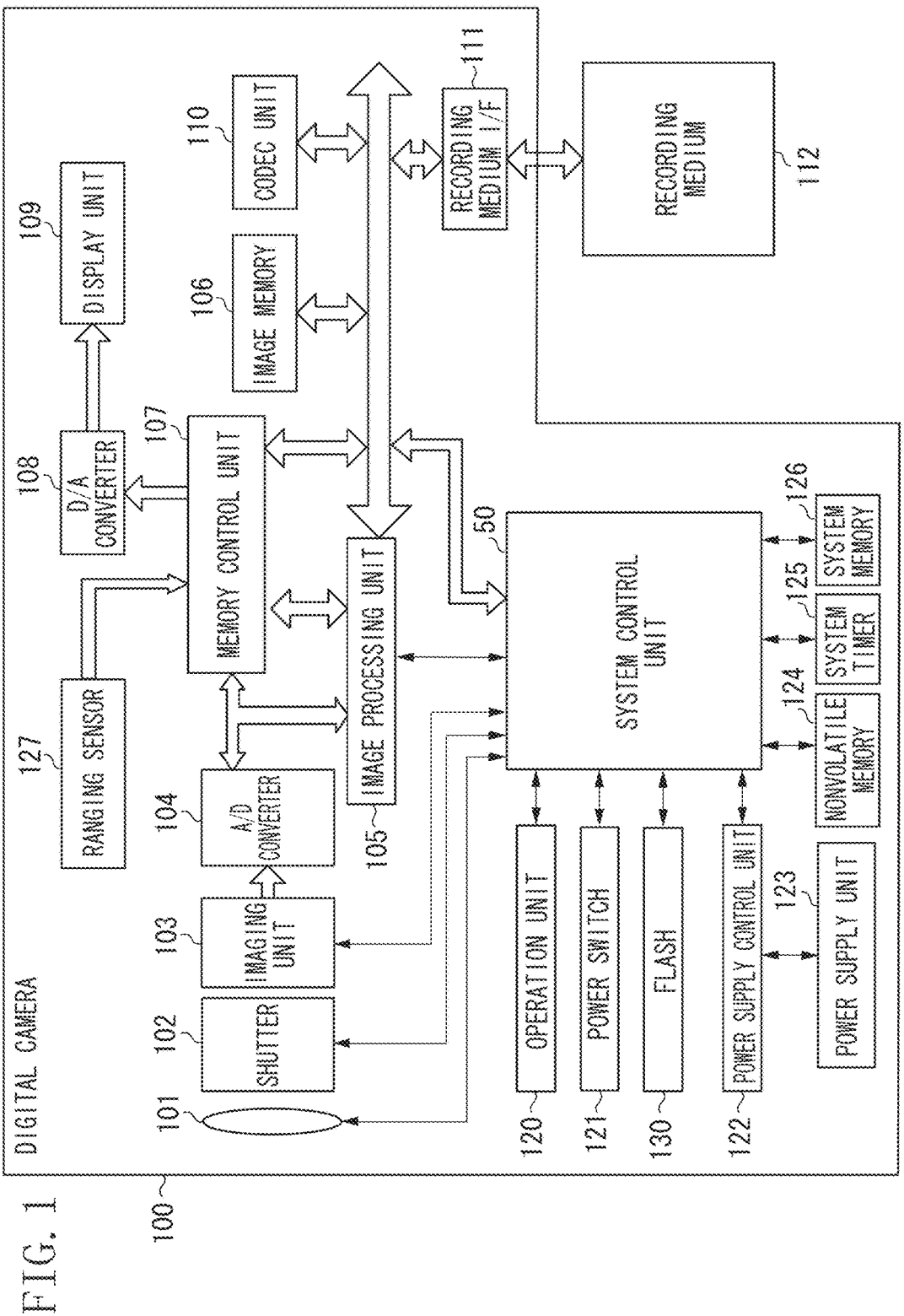
FIG. 1 is a block diagram illustrating a configuration of a digital camera according to one or more aspects of the present disclosure.

FIG. 1 is a block diagram illustrating an example of a configuration of a digital camera 100 according to one or more aspects of the present disclosure.

In FIG. 1, a lens group 101 includes a zoom lens and a focus lens. A shutter 102 has an aperture function. The shutter 102 exposes an image sensor included in an imaging unit 103, according to control of a system control unit 50. The imaging unit 103 photoelectrically converts an optical image obtained through the lens group 101, into an electrical signal. The imaging unit 103 includes an image sensor such as a charge-coupled device (CCD) or complementary metal oxide semiconductor (CMOS) image sensor. An analog-to-digital (A/D) converter 104 converts an analog signal read from the imaging unit 103 into a digital signal and outputs image data to an image processing unit 105.

The image processing unit 105 performs various kinds of image processing such as white balance processing, gamma processing, and color correction processing, on image data output from the A/D converter 104 or image data output from a memory control unit 107. When the image processing unit 105 performs various kinds of image processing, an image memory 106 temporarily stores image data. The image memory 106 also stores image data read from a recording medium 112 via a recording medium interface (I/F) 111, and image data to be displayed by a display unit 109. The memory control unit 107 controls reading from and writing into the image memory 106. A digital to analog (D/A) converter 108 converts, for example, data for image display stored in the image memory 106, into an analog signal, and outputs the analog signal to the display unit 109. The display unit 109 has a display such as a liquid crystal display (LCD). The display unit 109 displays images such as an image captured by the digital camera 100, an image read from the recording medium 112, and a live view image. The display unit 109 also displays a user interface for a user to operate the digital camera 100. A codec unit 110 compresses to encode and decodes image data. The codec unit 110 encodes or decodes image data recorded in the image memory 106, in a format in conformity with a standard such as a Motion Picture Experts Group (MPEG) format.

The recording medium I/F 111 mechanically and electrically connects the recording medium 112 to the digital camera 100. The recording medium 112 is, for example, an attachable/detachable recording medium such as a semiconductor memory card or a card-type hard disk. The system control unit 50 may include a central processing unit (CPU) or a micro processing unit (MPU). The system control unit 50, which may include one or more processors, one or more memories, circuitry, firmware, hardware, other component, or the like, may control functions of the entire digital camera 100, by, for example, loading one or more programs, instructions, codes, or the like, stored in a nonvolatile memory 124 into a work area of a system memory 126, and executing the loaded programs, instructions, codes, or the like.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

An operation unit 120 includes a touch panel serving as an interface displayed on the display unit 109, a button, and a switch. The operation unit 120 notifies the system control unit 50 of the content of operation performed by the user onto the operation unit 120. A power switch 121 is a switch to be operated for switching on/off of power supplied to the digital camera 100. A power supply control unit 122 detects attachment/detachment of a battery, the type of a battery, and a remaining amount of a battery. A power supply unit 123 supplies power to the digital camera 100.

The nonvolatile memory 124 is an electrically recordable and erasable storage medium. For example, an electrically erasable programmable read only memory (EEPROM) is used for the nonvolatile memory 124. A system timer 125 measures time to be used for various kinds of control, and time of a built-in clock. The system memory 126 is a system memory, into which constants and variables for operating the system control unit 50 as well as a program read from the nonvolatile memory 124 are to be loaded. A ranging sensor 127 measures a distance from the digital camera 100 to an object. A flash 130 is a light emission device that emits light to an object at a time of image capturing.

Next, an example of a flow of basic processing when capturing an image of an object in the digital camera 100 according to the present exemplary embodiment will be described. First, the imaging unit 103 photoelectrically converts light incident via the lens group 101 and the shutter 102, and then outputs the light to the A/D converter 104 as an analog image signal. The A/D converter 104 converts the analog image signal output from the imaging unit 103 into a digital image signal, and outputs the digital image signal to the image processing unit 105.

The image processing unit 105 performs processing including color conversion processing such as white balance processing and gamma processing, on image data output from the A/D converter 104 or image data read from the memory control unit 107. The image processing unit 105 then outputs image data, which is either Bayer RGB data, or luminance and color difference signals (Y, R-Y, B-Y), obtained by the above-described processing. The image data output from the image processing unit 105 is written into the image memory 106 via the memory control unit 107. Further, the image processing unit 105 performs predetermined arithmetic processing, using image data obtained by image capturing. The system control unit 50 performs exposure control and ranging control, based on the result of the arithmetic processing in the image processing unit 105. In this way, processing such as automatic focus (AF) processing and automatic exposure (AE) processing of a through the lens (TTL) system is performed. Further, the image processing unit 105 infers a light source by analyzing the image data obtained by image capturing, and performs automatic white balance (AWB) processing, based on the inferred light source.

The image memory 106 stores image data output from the imaging unit 103, and image data to be displayed on the display unit 109.

The D/A converter 108 converts data for image display stored in the image memory 106 into an analog signal, and outputs the analog signal to the display unit 109. The display unit 109 performs display according to the analog signal output from the D/A converter 108, on the display such as a LCD. The codec unit 110 compresses and encodes image data recorded in the image memory 106, based on a standard such as an MPEG format.

Other than the above-described basic operation, the system control unit 50 implements each process to be described below according to the present exemplary embodiment, by executing the program recorded in the nonvolatile memory 124 described above. The program described here is a program for executing a flowchart to be described below in the present exemplary embodiment. At this time, the constants and variables for the operation of the system control unit 50 and the program read from the nonvolatile memory 124 are loaded into the system memory 126.

Next, an example of processing by the image processing unit 105 when highlight correction is performed will be described with reference to FIGS. 2 to 6. In the present exemplary embodiment, there will be described, as an example, a case where a first image at the time of flash emission, and a second image at the time of no flash emission are consecutively captured. In this case, an object, which is a target of highlight correction, in the first image and that in the second image are supposed to be at about the same position. Here, the first image at the time of flash emission is an image obtained by imaging an area including the face of a person, which is the target object, in a state where light is emitted by the flash 130. The second image at the time of no flash emission is an image obtained by imaging an area including the face of the person, which is the target object, in a state that no light is emitted by the flash 130. In the following description, the first image at the time of flash emission will be referred to as a first image as necessary, and the second image at the time of no flash emission will be referred to as a second image as necessary.

Figure 2:
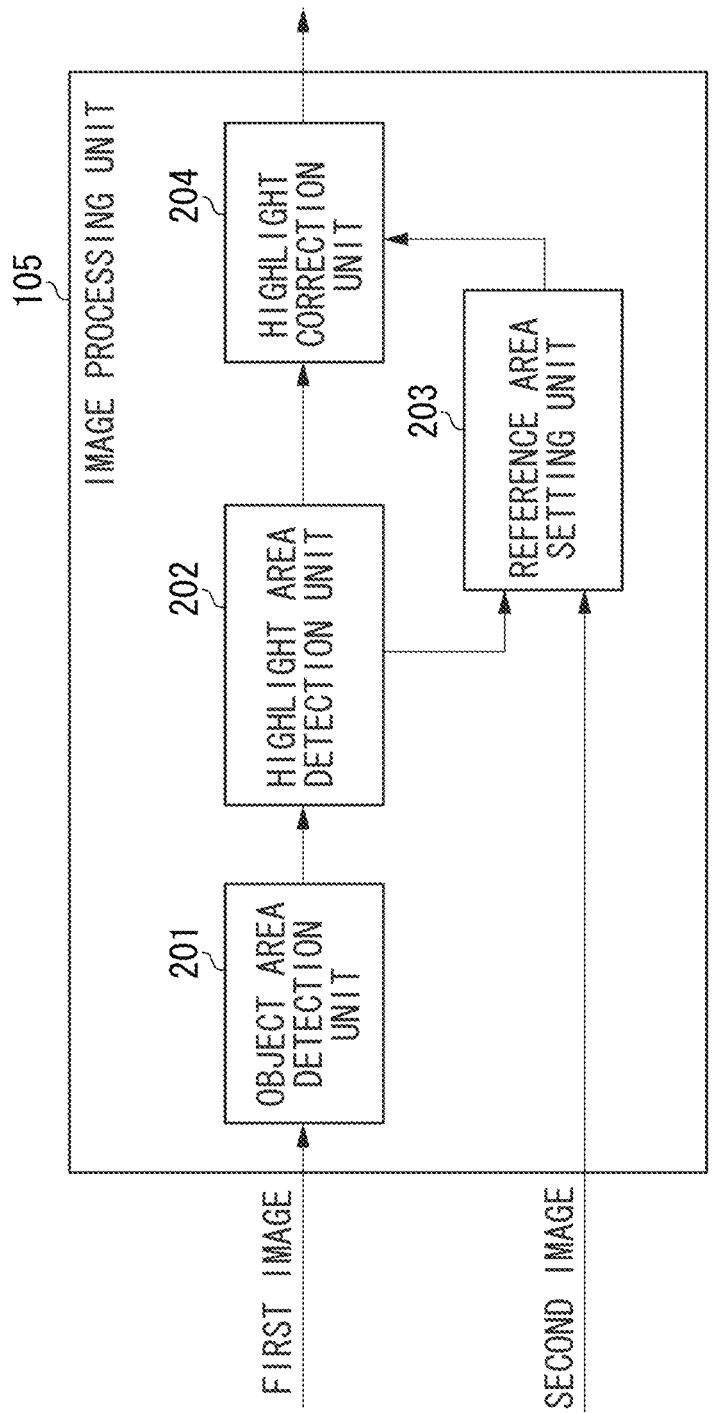
FIG. 2 is a block diagram illustrating a configuration of an image processing unit according to one or more aspects of the present disclosure.

FIG. 2 is a block diagram illustrating an example of a functional configuration of the image processing unit 105. FIG. 3 is a flowchart illustrating an example of processing by the image processing unit 105 when the highlight correction is performed. An example of the processing of the image processing unit 105 will be roughly described with reference to FIG. 3.

In step S301, the image processing unit 105 acquires the first image at the time of flash emission and the second image at the time of no flash emission.

In step S302, an object area detection unit 201 detects a face area from the first image. For example, based on a feature amount of each of organs of a face set beforehand, and the first image, the object area detection unit 201 detects organs such as eyes and a mouth from the first image. Based on the result of this detection, the object area detection unit 201 can detect a face area. Such a method for detecting the face area can be implemented using an existing method, and therefore will not be described here in detail. In addition, various methods may be employed for the method for detecting the face area and thus, the method for detecting the face area is not limited to the above-described example.

In step S303, a highlight area detection unit 202 detects a high luminance area as a highlight area, in the face area detected in step S302.

In step S304, based on the second image, a reference area setting unit 203 sets a reference area to be referred to when the highlight area detected in step S303 is corrected in the first image.

In step S305, a highlight correction unit 204 calculates a complementary color of the reference area set in step S304.

In step S306, the highlight correction unit 204 performs highlight correction on the highlight area detected in step S303, with reference to the complementary color calculated in step S305.

Next, an example of detailed processing in step S303 to step S306 will be described.

In step S303, the highlight area detection unit 202 detects the high luminance area in the face area. As an example of a method of detecting the high luminance area, there is a method for determining whether the luminance of each pixel of a face area is equal to or higher than a predetermined threshold T1, and extracting pixels each having a luminance equal to or higher than the predetermined threshold T1, as the high luminance area. For example, an average luminance of the face area may be used as the threshold T1. However, the method for determining the threshold T1 is not limited to this example. In a case where the extracted pixels are adjacent to each other, the highlight area detection unit 202 handles these pixels as pixels of the same highlight area. The pixel having the luminance equal to or higher than the threshold T1 is extracted as a pixel of the highlight area, among the pixels of the face area, by the processing in step S303. In the present exemplary embodiment, for example, the highlight area realizes an example of a first area.

Figure 4A:
FIGS. 4A and 4B are diagrams illustrating a method for setting a reference area according to one or more aspects of the present disclosure.
Figure 4B:

In step S304, the reference area setting unit 203 sets the reference area. The reference area is an area to be referred to by the highlight correction unit 204 at a time of correcting the highlight area detected in step S303, within the area of the first image. FIGS. 4A and 4B are diagrams illustrating an example of a method for setting the reference area. FIG. 4A illustrates an example of the first image at the time of flash emission, and FIG. 4B illustrates an example of the second image at the time of no flash emission.

When a highlight area 401 is detected, first, the reference area setting unit 203 sets an area (S1) in the second image as a corresponding area 402, which corresponds to the pixels of the highlight area 401, as illustrated in FIG. 4A. The corresponding area (S1) 402 is supposed to be an area including pixels, which are in the second image and each at the same coordinates as that of the corresponding one of the pixels of the highlight area 401 in the first image. In the present exemplary embodiment, for example, the corresponding area 402 realizes an example of a third area.

Next, the reference area setting unit 203 detects an area (S2) in the second image as a similar area 403, which has pixel values close to those of the corresponding area (S1) 402. For example, the reference area setting unit 203 detects the similar area (S2) 403 as follows. First, the reference area setting unit 203 calculates an average value Avg of luminance in the corresponding area (S1) 402. Next, the reference area setting unit 203 detects a pixel having a luminance value In close to the average value Avg of the luminance in the corresponding area (S1) 402, as a pixel constructing the similar area (S2) 403. This pixel is detected using a threshold T2 for the luminance value In of each of the pixels of the face area of the second image, as indicated by an expression (1).

$$|In-Avg|<T2 \qquad (1)$$

In the present exemplary embodiment, for example, the value ($|In-Avg|$) on the left side of the expression (1) realizes an example of a value for evaluating closeness between a pixel value of the third area and a pixel value of an area different from the third area of the second image. Further, in the present exemplary embodiment, for example, as indicated by the expression (1), the value for evaluating closeness between a pixel value of the third area and a pixel value of an area different from the third area of the second image is compared with a threshold.

The reference area setting unit 203 determines an area formed of pixels, which each have the luminance value In satisfying the expression (1) and which are adjacent to each other, as the one similar area (S2) 403. When detecting the two or more similar areas (S2) 403, the reference area setting unit 203 selects one of the similar areas (S2) 403. For example, the reference area setting unit 203 can derive the sum total of the values ($|In-Avg|$) on the left side of the expression (1), for each of the similar areas (S2) 403, and then select the similar area (S2) 403 having the smallest sum total. Alternatively, the reference area setting unit 203 can select the similar area (S2) 403 closest to the highlight area 401, among the similar areas (S2) 403. Still alternatively, the reference area setting unit 203 may select one similar area (S2) 403, according to the above-described criteria, from among the similar areas (S2) 403 of a size equal to or higher than a threshold.

FIG. 5 is a diagram illustrating an example of a relationship between the average value Avg of the luminance in the corresponding area (S1) 402, and the threshold T2. As illustrated in FIG. 5, the reference area setting unit 203 sets the threshold T2 of the expression (1), in such a manner that the threshold T2 becomes greater, as the average value Avg of the luminance in the corresponding area (S1) 402 becomes greater, with consideration of light shot noise. The case where the threshold T2 is set to be proportional to the average value Avg of the luminance in the corresponding area (S1) 402 is described with reference to FIG. 5, as an example. However, the relationship between these values is not limited to the proportional relationship. For example, the threshold T2 may be set to increase nonlinearly, as the average value Avg of the luminance in the corresponding area (S1) 402 increases. Further, the reference area setting unit 203 may set the threshold T2, with consideration of noise other than the light shot noise. In the present exemplary embodiment, for example, the average value Avg of the luminance in the corresponding area (S1) 402 realizes an example of a representative value of pixel values of the third area of the second image.

Furthermore, although the case where the luminance value is used as the pixel value is described in the present exemplary embodiment, the pixel value is not limited to the luminance value. For example, an RGB value may be used as the pixel value. In the present exemplary embodiment, for example, the similar area 403 realizes an example of a fourth area. Further, in the present exemplary embodiment, for example, based on the pixel value of an area different from the third area of the second image, the threshold is changed by setting the threshold T2 according to FIG. 5.

Next, the reference area setting unit 203 sets an area constituted by pixels each being at the same coordinates as that of the corresponding one of the pixels of the detected similar area (S2) 403 in the first image as a reference area 404. The color of skin in the highlight area in a state of no highlight can be identified by using the second image at the time of no flash emission. Moreover, an area close to the identified color in the first image can be set as the reference area 404. In the present exemplary embodiment, the reference area 404 can realize an example of the first area.

In step S305, the highlight correction unit 204 calculates the complementary color of the reference area 404 set in step S304. The highlight correction unit 204 calculates an average color of the colors of the pixels set as the reference area 404, and further calculates a complementary color of the calculated average color. For example, the highlight correction unit 204 calculates the complementary color as follows.

Assume that the color of each pixel is expressed as (R, G, B) in an RGB space, and the number of pixels included in the reference area 404 is i2. In this case, a color Cs of the reference area 404 is obtained as indicated by expressions (2) to (5).

$$Cs=(AvgR, AvgG, AvgB) \quad (2)$$

$$AvgR=\Sigma R/i2 \quad (3)$$

$$AvgG=\Sigma G/i2 \quad (4)$$

$$AvgB=\Sigma B/i2 \quad (5)$$

Here, R, G, and B are each assumed to take a value in a range of 0 to 255. Since R, G, and B each take a value in the range of 0 to 255, a complementary color Cc of the color Cs of the reference area 404 is determined as indicated by an expression (6) as follows.

$$Cc=(255-AvgR, 255-AvgG, 255-AvgB) \quad (6)$$

In step S306, the highlight correction unit 204 performs the highlight correction on the highlight area 401, with reference to the complementary color Cc calculated in step S305. In this processing, a color CH of each pixel after the highlight correction is calculated for a color Ch of each pixel before the highlight correction, by using a coefficient ky, as indicated by an expression (7) as follows.

$$CH=Ch-ky \times Cc \quad (7)$$

In the expression (7), the coefficient ky by which the complementary color Cc is multiplied may be determined as appropriate. Here, the coefficient ky is assumed to be determined based on a luminance Yh of each pixel of the highlight area 401, as indicated by an expression (8) as follows.

$$ky=\alpha \times (Yh/255) \quad (8)$$

In the present exemplary embodiment, assume that the luminance is expressed in the range of 0 to 255. Further, a coefficient α is a value that takes a value in a range of 0 to 1, and is used to adjust the degree of the highlight correction. The user may determine the value of the coefficient α as appropriate. In the present exemplary embodiment, for example, the value ((R, G, B)) of the color Ch of each pixel before the highlight correction realizes a value of the first area. Further, for example, the value ((AvgR, AvgG, AvgB)) of the color Cs of the reference area 404 realizes an example of a representative value of the colors of a second area. Furthermore, for example, the value ((255−AvgR, 255−AvgG, 255−AvgB)) of the complementary color Cc of the color Cs of the reference area 404 realizes the value of the complementary color of the representative value of the colors of the second area. Still furthermore, for example, the coefficient ky realizes an example of a coefficient to multiply the value of the complementary color of the representative value of the colors of the second area.

Figure 6:
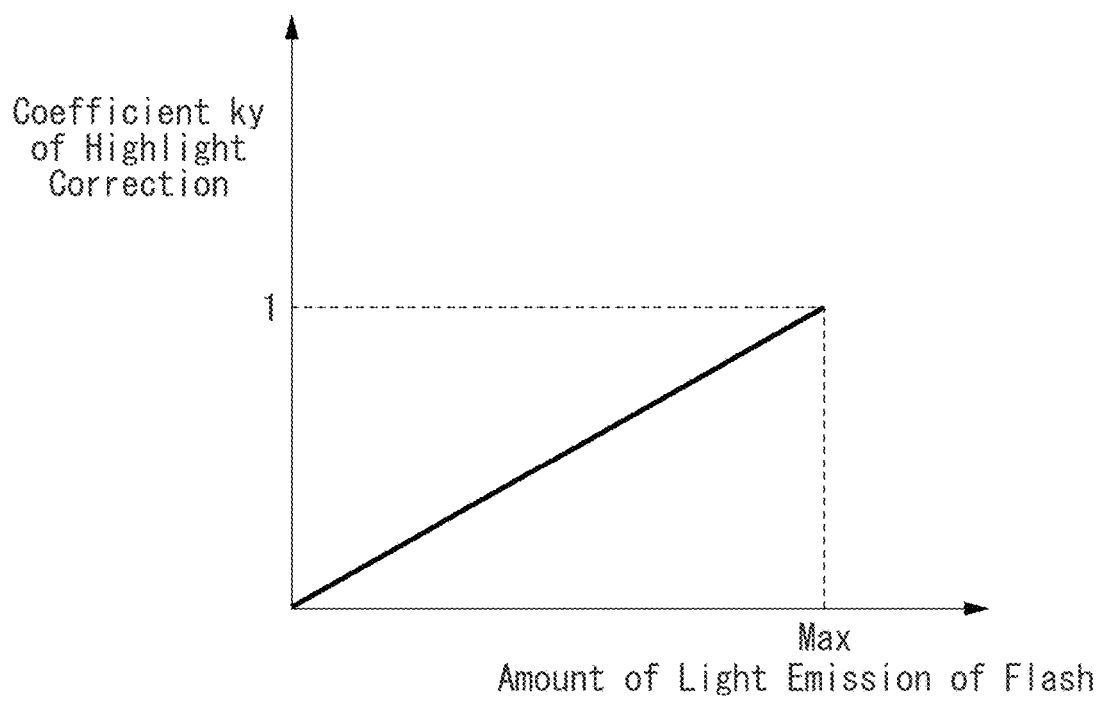
FIG. 6 is a graph illustrating a relationship between an amount of light emission of a flash, and a coefficient of highlight correction according to one or more aspects of the present disclosure.

The coefficient ky may be determined according to an amount of light emission of the flash 130, without being limited to the determination method based on the calculation of the expression (8). FIG. 6 is a graph illustrating an example of a relationship between the amount of light emission of the flash 130 and the coefficient ky of the highlight correction. The intensity of the highlight increases, as the amount of light emission of the flash 130 increases. Therefore, as illustrated in FIG. 6, a color correction amount for the highlight area 401 may be increased by increasing the coefficient ky of the highlight correction as the amount of light emission of the flash 130 increases. For example, the highlight correction unit 204 may store beforehand a table in which the amount of light emission of the flash 130 and the coefficient α are associated with each other. The highlight correction unit 204 can determine the coefficient ky, with consideration of both of the luminance Yh of each pixel and the amount of light emission of the flash 130, by determining the coefficient α by using this table. However, the highlight correction unit 204 may determine the coefficient ky, without consideration of the luminance Yh of each pixel. In this case, for example, the highlight correction unit 204 stores beforehand a table in which the amount of light emission of the flash 130 and the coefficient ky are associated with each other. The highlight correction unit 204 can decide the coefficient ky by using this table.

In the present exemplary embodiment, the case where the highlight area 401 is one is described as an example. However, even if the plurality of highlight areas 401 is detected, highlight correction can be performed in a manner similar to that described in the present exemplary embodiment. For example, in a case where the plurality of highlight areas 401 is detected in step S303, step S304 to step S306 may be repeated for each of the highlight areas 401.

As described above, in the present exemplary embodiment, the image processing unit 105 extracts the corresponding area 402 corresponding to the highlight area 401 in the first image at the time of flash emission, from the second image at the time of no flash emission. The image processing unit 105 subsequently extracts the area having the pixel values close to those of the corresponding area 402 from the second image at the time of no flash emission, as the similar area 403. The image processing unit 105 then sets the area corresponding to the similar area 403 in the first image at the time of flash emission, as the reference area 404. The image processing unit 105 then corrects the color of the highlight area 401, based on the color of the reference area 404. Therefore, a difference between the color of the highlight area after the highlight correction and the color around the highlight area can be reduced. Accordingly, unnatural color of skin after the highlight correction can be suppressed.

Here, consideration may be given to a change in the relative position of a target object between the first image at the time of flash emission and the second image at the time of no flash emission. For example, in a case where there is a time lag between capturing of the first image at the time of flash emission and capturing of the second image at the time of no flash emission, there is a possibility that an object has made a large movement. In this case, the highlight correction unit 204 detects a movement amount of the object between the first image at the time of flash emission and the second image at the time of no flash emission. Assuming that the smaller the movement amount is, the higher the accuracy of the detection of the reference area 404 is, the highlight correction unit 204 increases the correction amount of the highlight correction. In other words, the highlight correction unit 204 sets the correction amount of the highlight correction to be smaller, as the movement amount of the object is larger. For example, the highlight correction unit 204 increases the coefficient ky (e.g., the coefficient α) when increasing the correction amount of the highlight correction, and lowers the coefficient ky (e.g., the coefficient α) when decreasing the correction amount of the highlight correction. The movement amount of the object can be detected using an existing method such as a method using a motion vector, and thus will not be described here in detail.

Alternatively, consideration may be given to a change in the relative position of the target object between the first image at the time of flash emission and the second image at the time of no flash emission, as another method. For example, the highlight correction unit 204 may increase the correction amount of the highlight correction, with decrease in a difference in image capturing time (an imaging interval) between the first image at the time of flash emission and the second image at the time of no flash emission. Conversely, the highlight correction unit 204 may decrease the correction amount of the highlight correction, with increase in the difference in image capturing between these images.

The highlight correction unit 204 may determine the coefficient ky, by combining at least two of the amount of light emission of the flash 130, the movement amount of the object, and the imaging interval. For example, the highlight correction unit 204 stores beforehand a table in which at least one of the amount of light emission of the flash 130, the movement amount of the object, and the imaging interval is associated with the coefficient ky or the coefficient α. By using this table, the highlight correction unit 204 can derive the coefficient ky. For example, the highlight correction unit 204 may store a table in which at least one of the amount of light emission of the flash 130, the movement amount of the object, and the imaging interval is associated with the coefficient α. The highlight correction unit 204 can determine the coefficient ky with consideration of also the luminance Yh of each pixel, by determining the coefficient α by using this table.

The above-described exemplary embodiments merely exemplifies an embodiment in implementing the present disclosure, and the technical scope of the present disclosure is not to be interpreted in a limited way. In other words, the present disclosure can be implemented in various forms, without deviating from the technical ideas thereof, or the substantial features thereof.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, the difference between the color of the highlight area after the highlight correction and the color around the highlight area can be reduced. Accordingly, unnatural color of skin after the highlight correction can be suppressed.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-254826, filed Dec. 28, 2016, which is hereby incorporated by reference herein in its entirety.

What is claimed is:

1. An image processing apparatus comprising:
at least one memory and at least one processor that function as:
a detection unit configured to detect a first area from a first image including an area of a face of an object, the first image being an image captured by an imaging unit in a state where light is emitted by a flash, and the first area being an area with luminance higher than a first threshold, within the area of the face;
a determination unit configured to determine a second area in the first image, based on a second image including an area of the face of the object and captured by the imaging unit in a state where light is not emitted by the flash; and a correction unit configured to correct a color of the first area in the first image, by using information about a color of the second area, wherein the determination unit determines an area corresponding to the first area of the first image as a third area, from the second image, and, based on a result of a comparison between a pixel value of the third area and a pixel value of an area different from the third area of the second image, the determination unit determines a fourth area from the area different from the third area, within the second image, and determines an area of the first image corresponding to the fourth area as the second area.

2. The image processing apparatus according to claim 1, wherein the correction unit determines a color correction amount of the first area, by using a value of a color of the first area, a value of a complementary color of a representative value of colors of the second area, and a coefficient by which the value of the complementary color of the representative value of the colors of the second area is multiplied.

3. The image processing apparatus according to claim 1, wherein the correction unit sets the first threshold, based on an average luminance of the area of the face in the first image.

4. The image processing apparatus according to claim 1, wherein the first image and the second image are images captured consecutively, and wherein the determination unit determines as the third area, in the second image, an area at a same position as a position of the first area in the first image.

5. The image processing apparatus according to claim 1, wherein the determination unit derives a value for evaluating closeness between the pixel value of the third area and the pixel value of the area different from the third area of the second image, and determines the fourth area, based on a result of a comparison between the derived value and a second threshold.

6. The image processing apparatus according to claim 5, wherein the determination unit changes the second threshold, based on a representative value of pixel values of the third area of the second image.

7. The image processing apparatus according to claim 1, wherein the correction unit determines a color correction amount of the first area, based on at least one of pixel values of the first area, an amount of light emission by the flash, a movement amount of the object in the first image and the second image, and an imaging interval between the first image and the second image.

8. A non-transitory computer-readable storage medium storing a program for causing a computer to execute the image processing method comprising:

detecting a first area from a first image including an area of a face of an object, the first image being an image captured in a state where light is emitted by a flash, and the first area being an area with luminance higher than a first threshold, within the area of the face;

determining a second area that is an area different from the first area in the first image based on a second image including an area of the face of the object and captured in a state where light is not emitted by the flash; and correcting a color of the first area in the first image, by using information about a color of the second area, wherein in the determining, an area corresponding to the first area of the first image is determined as a third area, from the second image, and based on a result of a comparison between a pixel value of the third area, and a pixel value of an area different from the third area of the second image, a fourth area from the area different from the third area is determined, within the second image, and an area of the first image corresponding to the fourth area is determined as the second area.

9. An image processing method comprising:

detecting a first area from a first image including an area of a face of an object, the first image being an image captured in a state where light is emitted by a flash, and the first area being an area with luminance higher than a first threshold, within the area of the face;

determining a second area that is an area different from the first area in the first image, based on a second image including an area of the face of the object and captured in a state where light is not emitted by the flash; and correcting a color of the first area in the first image, by using information about a color of the second area, wherein in the determining, an area corresponding to the first area of the first image is determined as a third area, from the second image, and based on a result of a comparison between a pixel value of the third area, and a pixel value of an area different from the third area of the second image, a fourth area from the area different from the third area is determined, within the second image, and an area of the first image corresponding to the fourth area is determined as the second area.

10. An image processing method according to claim 9, wherein, in the correcting, an area corresponding to the first area of the first image is determined as a third area, from the second image, and based on a result of a comparison between a pixel value of the third area, and a pixel value of an area different from the third area of the second image, a fourth area is determined from the area different from the third area, within the second image, and an area of the first image corresponding to the fourth area is determined as the second area.

* * * * *